United States Patent
Teraoka

[19]
[11] Patent Number: 6,009,528
[45] Date of Patent: *Dec. 28, 1999

[54] COMMUNICATION SYSTEM AND COMMUNICATION APPARATUS

[75] Inventor: Fumio Teraoka, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/778,209

[22] Filed: Dec. 30, 1996

[30] Foreign Application Priority Data

Jan. 11, 1996 [JP] Japan .............................. P08-003009
Dec. 25, 1996 [JP] Japan .............................. P08-344862

[51] Int. Cl.$^6$ .................................................. G06F 13/00
[52] U.S. Cl. ........................... 713/201; 380/23; 709/239; 707/9
[58] Field of Search .............................. 395/187.01, 186, 395/188.01, 200.69, 200.74; 380/23, 25; 707/9; 714/712; 713/200, 201, 202; 709/214, 239

[56] References Cited

U.S. PATENT DOCUMENTS

| | | | |
|---|---|---|---|
| 4,919,545 | 4/1990 | Yu ...................................... | 395/187.01 |
| 5,001,755 | 3/1991 | Skret ........................................ | 380/46 |
| 5,226,079 | 7/1993 | Holloway ............................ | 395/187.01 |
| 5,233,655 | 8/1993 | Shapiro ..................................... | 380/23 |
| 5,416,842 | 5/1995 | Aziz ......................................... | 380/30 |
| 5,511,122 | 4/1996 | Atkinson ................................. | 380/25 |
| 5,548,721 | 8/1996 | Denslow ............................ | 395/187.01 |
| 5,586,260 | 12/1996 | Hu ......................................... | 395/200.2 |
| 5,594,869 | 1/1997 | Hawe et al. .......................... | 395/200.2 |
| 5,608,800 | 3/1997 | Hoffman et al. .................... | 395/187.01 |
| 5,623,601 | 4/1997 | Vu ...................................... | 395/187.01 |
| 5,671,283 | 9/1997 | Michener et al. ........................ | 380/25 |
| 5,684,951 | 11/1997 | Goldman et al. .................. | 395/187.01 |

FOREIGN PATENT DOCUMENTS

| | | | |
|---|---|---|---|
| 9-107389 | 4/1997 | Japan .............................. | H04L 29/08 |
| 9-172451 | 6/1997 | Japan ............................. | H04L 12/46 |

OTHER PUBLICATIONS

Data Encryption Standard, Federal Information Processing Standards Publication 46, Jan. 15, 1977.

S. Miyaguchi, "The Feal Cipher Family," Lecture Notes in Computer Science, 537, Advances in Cryptology–Crypto '90 Proceedings, Aug. 11–15, 1990, pp. 627–638.

R. Rivest, "The MD4 Message Digest Algorithm," Lecture Notes in Computer Science, 537, Advances in Cryptology–Crypto '90 Proceedings, Aug. 11–15, 1990, pp. 303–311.

Secure Hash Standard, Federal Information Processing Standards Publication 180, May 11, 1993.

*Primary Examiner*—Dieu-Minh T. Le
*Attorney, Agent, or Firm*—Limbach & Limbach LLP; Seong-Kun Oh

[57] ABSTRACT

A communication system includes a communication apparatus for connecting a first network to a second network, wherein a packet transmitted by a transmitting station in the first network by way of the communication apparatus to a receiving station in the second network is relayed selectively by the communication apparatus to the second network. First authentication information is created, in part, according to predetermined key information and the packet is transmitted with the header information thereof including the first authentication information. First authentication information in the header information of the packet is compared with second authentication information created, in part, according to predetermined key information, by the communication apparatus in order to determine whether or not the packet is to be relayed to the second network.

9 Claims, 7 Drawing Sheets

COMMUNICATION SYSTEM AND COMMUNICATION APPARATUS

BACKGROUND OF THE INVENTION

The present invention relates to a communication system and a communication apparatus, and particularly to a communication system and a communication apparatus that has an identifying function typically based on header information of a packet for enhancing the security of communication so that an external access to the inside of its own organization can be made from a location outside the organization.

A router is an apparatus that has a plurality of network interfaces and is used for relaying packets. FIG. 9 is a block diagram showing a typical configuration of a router 100. In this router 100, a packet received by a predetermined network interface 1a, 1b or 1c is retransmitted by one of the network interfaces 1a, 1b and 1c which is determined by a transmission-network-interface selecting unit 2. A routing table 3 is used by the transmission-network-interface unit 2 in determining one of the network interfaces 1a, 1b and 1c for retransmitting the packet.

A router that is connected to the external world and selectively relays packets from the external world to a predetermined organization in order to protect the network in the organization is in particular called a fire wall. FIG. 10 is a block diagram showing a typical configuration of a fire wall 200. Since the fire wall 200 is a router for selectively relaying packets as described above, the fire wall 200 is the router 100 shown in FIG. 9 that has a packet discriminating unit 11 with a function for selecting and rejecting a packet.

The packet discriminating unit 11 selects a packet by using header information included in the header of the packet. The header information includes, among other data, a source address, a destination address and a protocol type. Thus, the packet discriminating unit 11 can selectively relay only a packet transmitted from a predetermined transmitting host to the organization.

However, the contents of the header information are not always valid. This is because an unauthorized user may use invalid header information. As a result, such an unauthorized user may make an access to the inside of the organization, giving rise to a problem that the communication security cannot be preserved any more.

SUMMARY OF THE INVENTION

An object of the present invention is to provide a communication system and a communication apparatus capable of enhancing the security of a network by not relaying a packet transmitted by an unauthorized user.

To achieve the above object, according to a first aspect of the invention, there is provided a communication system including: a communication apparatus for connecting a first network to a second network; a transmitting station provided in the first network; and a receiving station provided in the second network; wherein a packet transmitted by the transmitting station in the first network by way of the communication apparatus to the receiving station in the second network is relayed selectively by the communication apparatus to the second network, the transmitting station including:
  a first storage means for storing predetermined key information;
  a first processing means for storing a predetermined processing method and for creating first authentication information on the basis of the predetermined key information stored in the first storage means and header information of a packet to be transmitted to the receiving station in accordance with the predetermined processing method; and
  a transmitting means for transmitting the packet with the header information thereof including the first authentication information created by the first processing means, and the communication apparatus including:
  a second storage means for storing predetermined key information;
  a second processing means for storing a predetermined processing method and for creating second authentication information on the basis of the predetermined key information stored in the second storage means and the header information of the packet transmitted by the transmitting station in accordance with the predetermined processing method;
  a comparison means for comparing the first authentication information included in the header information of the packet transmitted by the transmitting station with the second authentication information created by the second processing means; and
  a determination means for determining whether or not the packet is to be relayed to the second network in accordance with a result of comparison output by the comparison means.

In the transmitting station of the above communication system, a first processing means is used for storing a predetermined processing method and for creating first authentication information on the basis of predetermined key information stored in a first storage means and header information of a packet to be transmitted to the receiving station in accordance with the predetermined processing method, and a transmitting means is then used for transmitting the packet with the header information thereof including the first authentication information created by the first processing means. In the communication apparatus, on the other hand, a second processing means is used for storing a predetermined processing method and for creating second authentication information on the basis of predetermined key information stored in a second storage means and the header information of the packet transmitted by the transmitting station in accordance with the predetermined processing method, and a comparison means is then used for comparing the first authentication information included in the header information of the packet transmitted by the transmitting station with the second authentication information created by the second processing means. Finally, a determination means employed in the communication apparatus is used for determining whether or not the packet is to be relayed to the second network in accordance with a result of comparison output by the comparison means. As a result, it is possible to selectively relay a packet from a transmitting station only if the transmitting station has the same key information and the same processing method as the ones stored in the communication apparatus.

To achieve the above object, according to a second aspect of the present invention, there is provided a communication apparatus including a plurality of networks interfaces for relaying packets exchanged among networks wherein a packet received from a transmitting station of one of the networks by way of one of the network interfaces is retransmitted to a receiving station of another one of the networks by way of another one of the network interfaces, the communication apparatus further including: an authentication means for checking whether or not header information included in the packet received from the transmitting station by way of the network interface is valid header information; and a control means which is used for controlling an operation to relay the packet to the receiving station only if the authentication means has verified that the header information included in the packet received from the transmitting station by way of the network interface is valid header information.

In the above communication apparatus, an authentication means is used for checking whether or not header information included in a packet received from the transmitting station by way of a network interface is valid header information, and a control means controls an operation to relay the packet to the receiving station only if the authentication means has verified that the header information included in the packet received from the transmitting station by way of the network interface is valid header information. As a result, it is possible to relay only a packet, the header information of which is found valid.

BRIEF DESCRIPTION OF THE DRAWINGS

These and other objects of the invention will be seen by reference to the description, taken in connection with the accompanying drawings, in which.

DETAILED DESCRIPTION OF THE PREFERRED EMBODIMENTS

The present invention will become more apparent from the following detailed description of some preferred embodiments with reference to accompanying diagrams showing the embodiments. It should be noted before starting the following description that, in order to clarify one-to-one relations in the description of characterizing features of the present invention between each means of the present invention described in the claims and the corresponding means employed in the embodiments, the corresponding means employed in the embodiments is enclosed in parentheses following the means of the present invention with the corresponding means of the embodiments between the parentheses preceded by a phrase 'implemented typically by'.

Figure 1:
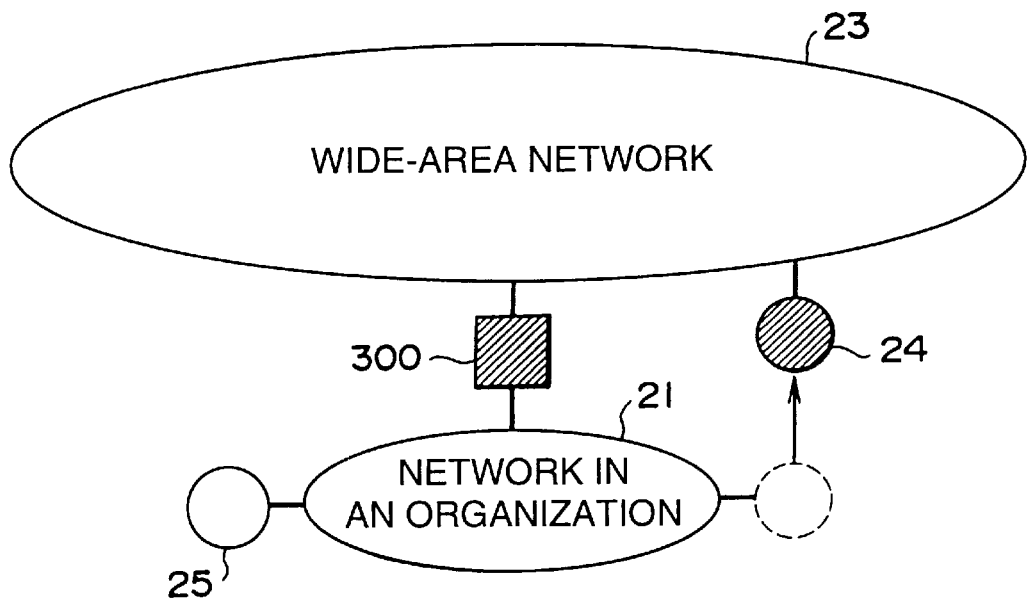
FIG. 1 is a diagram showing a typical configuration of an embodiment implementing networks to which the communication system provided by the present invention is applied.

In a communication system according to the present invention, a first network (implemented typically by a wide-area network 23 shown in FIG. 1) and a second network (implemented typically by a network 21 in an organization shown in FIG. 1) are connected to each other through a communication apparatus (implemented typically by a fire wall 300 shown in FIG. 1) and a packet transmitted by a transmitting station (implemented typically by a mobile host 24 shown in FIG. 1) in the first network by way of the communication apparatus to a receiving station (implemented typically by a host 25 shown in FIG. 1) in the second network is relayed selectively by the communication apparatus to the second network. The above transmitting station includes: a first storage means (implemented typically by a storage unit 24a shown in FIG. 2) for storing predetermined key information; a first processing means (implemented typically by a processing unit 24b shown in FIG. 2) for storing a predetermined processing method and for creating first authentication information on the basis of the predetermined key information stored in the first storage means and header information of a packet to be transmitted to the receiving station in accordance with the predetermined processing method; and a transmitting means (implemented typically by a transmitting/receiving unit 24c shown in FIG. 2) for transmitting the packet with the header information thereof including the first authentication information created by the first processing means. The above communication apparatus includes: a second storage means (implemented typically by an authenticator 31 shown in FIG. 3) for storing predetermined key information; a second processing means (implemented typically also by the authenticator 31 shown in FIG. 3) for storing a predetermined processing method and for creating second authentication information on the basis of the predetermined key information stored in the second storage means and the header information of the packet transmitted by the transmitting station in accordance with the predetermined processing method; a comparison means (implemented typically also by the authenticator 31 shown in FIG. 3) for comparing the first authentication information included in the header information of the packet transmitted by the transmitting station with the second authentication information created by the second processing means; and a determination means (implemented typically by a packet discriminating unit 11 shown in FIG. 3) for determining whether or not the packet is to be relayed to the second network in accordance with a result of comparison output by the comparison means.

In a communication system according to the present invention, the communication apparatus further has a conversion means (implemented typically by a routing table 3) for converting the second information into the first information of the transmitting station.

Figure 3:
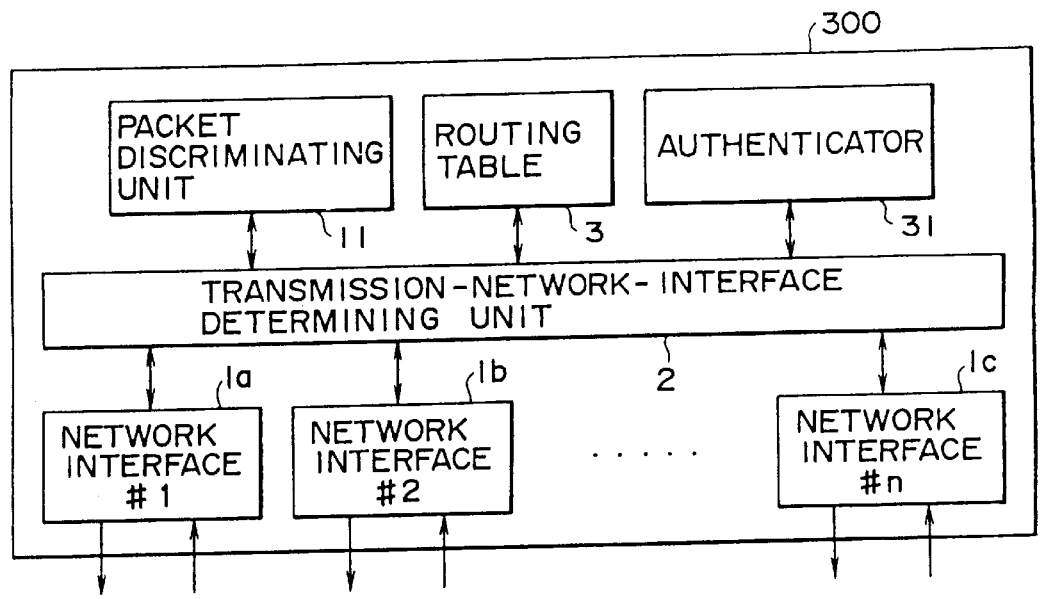
FIG. 3 is a block diagram showing a typical configuration of a fire wall shown in FIG. 1.

A communication apparatus according to the present invention includes a plurality of networks interfaces for relaying packets exchanged among networks wherein a packet received from a transmitting station of one of the networks by way of one of the network interfaces is retransmitted to a receiving station of another one of the networks by way of another one of the network interfaces, the communication apparatus further including: an authentication means (implemented typically also by the authenticator 31 shown in FIG. 3) for checking whether or not header information included in the packet received from the transmitting station by way of the network interface is valid header information; and a control means (implemented typically also by the packet discriminating unit 11 in conjunction with a transmission-network-interface determining unit 2 shown in FIG. 3) which is used for controlling an operation to relay the packet to the receiving station only if the authentication means has verified that the header information included in the packet received from the transmitting station by way of the network interface is valid header information.

It should be noted that, while the characterizing features of the invention have been described by exemplifying actual implementation of each means, the exemplification of the actual implementation is of course not intended to be construed in a limiting sense.

The embodiments implementing networks to which the communication system provided by the present invention is applied are described below. Before describing the embodiments, a VIP (Virtual Internet Protocol) is explained in brief.

A VIP is a protocol for implementing mobility-transparent communication (mobility transparency) by clear separation of a geographical-position indicator (or an address) from an identifier of a transmitting host.

The mobility transparency is a mobile transmitting hosts capability of communicating with a counterpart computer by means of a fixed permanent identifier without regard to the place at which the counterpart computer is located. The mobility transparency can be defined as the ability to sustain a logical communication route such as a TCP connection before and after movement of the mobile transmitting host. Mobility-transparent communication cannot be carried out in the Internet due to duality which is caused by the fact that an IP address includes both an address and an identifier.

In order to implement the mobility transparency described above, speaking in concrete terms, a VIP address is introduced as an identifier unique to each host in addition to the IP address which is used as a geographical-position indicator of the host.

Since the VIP address and the IP address have the same format, it is impossible to distinguish one from another. A relation between the VIP address and the IP address similar to the relation between a virtual address in a virtual storage system of an operating system and a physical address can, however, be established.

In order to carry out mapping from a VIP address to an IP address with a high degree of efficiency, a cache called an AMT (Address Mapping Table) is provided at a VIP layer. Data units composing the AMT are each referred to hereafter as an AMT entry. An AMT entry includes a VIP address, an IP address, address versions and pieces of other control information.

Figure 4:
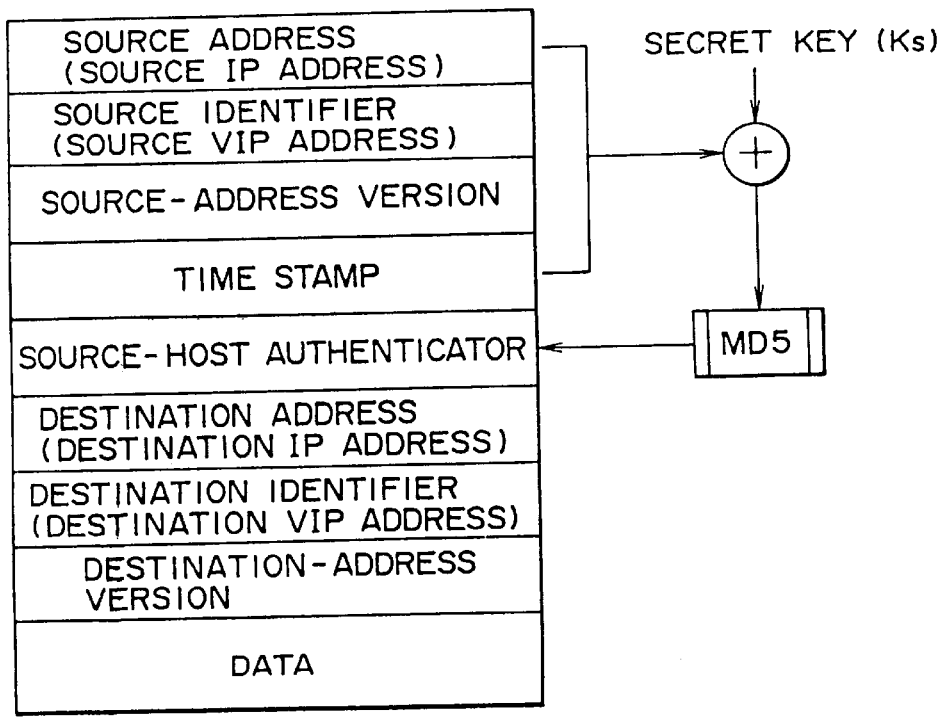
FIG. 4 is a diagram showing the format of a packet and a method of processing a source-host authenticator.

The header of a packet transmitted by a mobile computer such as a mobile host 24 shown in FIG. 1 includes the VIP address of the transmitting computer, which corresponds to the identifier of the transmitting host shown in FIG. 4, and the IP address of the transmitting host shown in FIG. 4. Thus, when a packet is transmitted by a mobile computer to a predetermined counterpart computer (that is, a receiving computer) in a predetermined network, a router at a point on a path leading to the receiving computer traveled by the packet and the receiving computer at the end of the path read out the VIP address and the IP address of the transmitting computer. In addition, the router also creates an AMT entry from the VIP address and the IP address.

In this way, as a general rule, an AMT entry is disseminated along a route traveled by a packet transmitted by a transmitting computer.

Since a VIP address is not dependent on the geographical position of the computer, a VIP address can be falsified with ease, that is, a VIP address can easily represent an unauthorized computer other than the authorized computer to which the VIP address is assigned. That is to say, the identification (or the VIP address) of another computer can be set as an identification of a transmitting computer in order to transmit the packet to a predetermined receiving computer with ease. In such a case, the receiving computer is allowed to receive the packet from an unauthorized computer indicated by the VIP address.

In order to solve the problem described above, a new authentication mechanism is introduced to the VIP in order to prevent an unauthorized computer from fraudulently posing as an authorized transmitting computer.

As the new authentication mechanism, a technique known as a keyed MD5 (message digest 5) is adopted. The MD5 technique is a kind of check-sum calculating method for generating 16-octet (128-bit) data (MD) from data having any arbitrary length. Since it is very difficult to generate data having a specific value as a calculation result of the MD5 technique, the MD5 technique is normally used for mutilation prevention.

In a keyed MD system, the transmitting computer on the transmitting side and the receiving computer on the receiving side share a common secret key. On the transmission side, MD data is calculated by using the keyed MD5 technique for data having a secret key added thereto. A result of the calculation is added to the data and transmitted along with the data. On the receiving side, on the other hand, the secret key is added to the received data for which MD data is calculated by using the keyed MD5 technique. A result of the calculation is then compared with the calculation result which has been added to the received data by the transmitting computer. Calculation results matching each other indicate that there is no mutilation in the course of communication provided that the transmitting and receiving sides share a common secret key. Thus, assuming that a third party does not know the secret key, the receiving side can authenticate the transmitting side as a valid transmitting side.

For example, the transmitting computer can calculate MD data using the keyed MD5 technique by adding a 16-octet (128-bit) secret key to a total of 20-octet (160-bit) data including, among other pieces of information, its own VIP address, its own IP address, address versions, an AMT-entry retaining time and a time stamp.

In addition, a mobile computer, that is, the transmitting computer can be set to share a secret key common to the fire wall of a network to which the mobile computer pertains. Only if the fire wall verifies that the mobile computer really pertains to the organization of its own, the fire wall will relay a packet transmitted by the mobile computer as an external packet to the inside of the organization.

FIG. 1 is a diagram showing a typical configuration of networks to which the communication system provided by the present invention is applied. In the case of the configuration shown in the figure, a local-area network 21 in an organization is connected to a wide-area network 23, for example the Internet, through a fire wall (FW) 300. In addition, a host (H) 25 is connected to the local-area network 21. Each host carries out communication based on the virtual Internet protocol (VIP).

Figure 2:
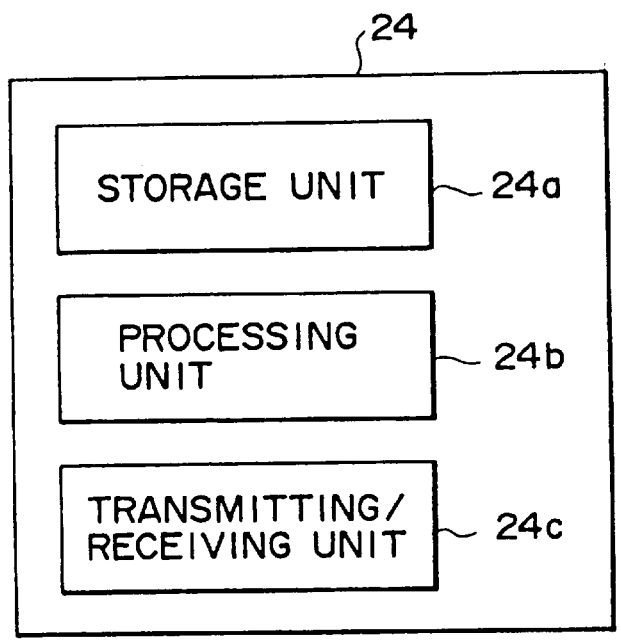
FIG. 2 is a block diagram showing a typical configuration of a mobile host shown in FIG. 1.

FIG. 2 is a diagram showing a typical configuration of a mobile host (MH) 24 shown in FIG. 1. A storage unit 24a is used for storing a secret key. A processing unit 24b is used for storing the processing method of a kind of check-sum calculation, for example, the MD5 (Message-Digest 5) technique. The processing unit 24b carries out check-sum calculation in order to generate a check-sum, that is, a source-host authenticator of the transmitting host which is used for verifying that information in the header of a packet to be transmitted is valid information on the basis of the secret key stored in the storage means 24a and header information of the packet in accordance with the processing method. A transmitting/receiving unit 24c is used for transmitting the packet with the header information thereof including the source-host authenticator produced by the processing unit 24b.

FIG. 3 is a block diagram showing a typical configuration of the fire wall 300 shown in FIG. 1. As shown in the figure, the fire wall 300 includes the conventional fire wall 200 shown in FIG. 10 and an authenticator 31 for determining whether or not information in the header of a received packet is valid information.

The authenticator 31 is used for storing the same secret key and the same processing method of a kind of check-sum calculation, typically the MD5 technique, as those owned by the mobile host 24. As will be described later, the authenticator 31 determines whether or not information in the header of a packet received by way of a predetermined one of network interfaces 1a to 1c is valid information. A packet discriminating unit 11 relays only a packet, the information in the header thereof has been validated by the authenticator 31, to the network 21 by way of one of the network interfaces 1a to 1c selected in accordance with a routing table 3.

Figure 10:
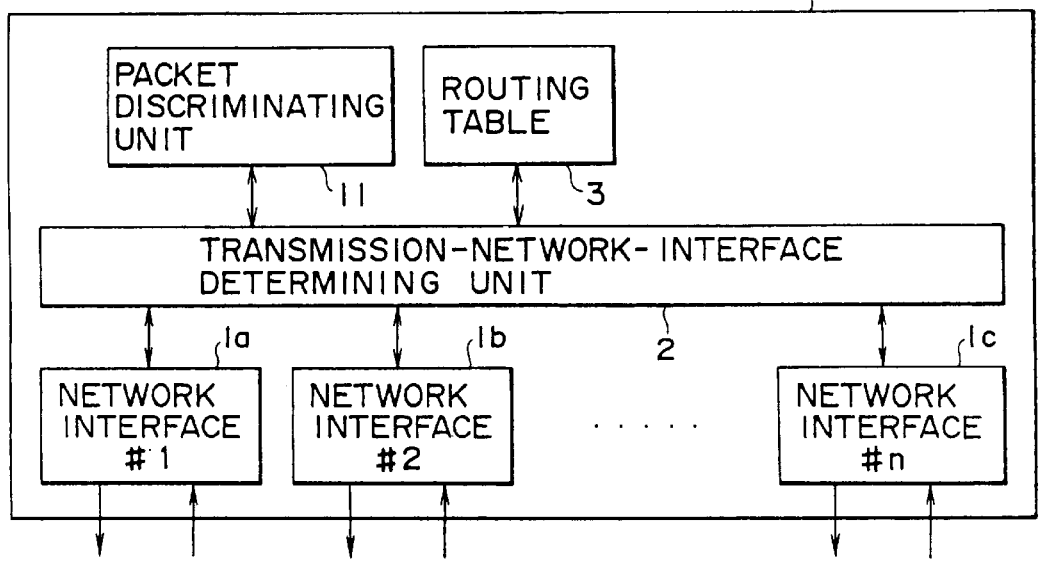
FIG. 10 is a block diagram showing a typical configuration of the conventional fire wall.

Since the rest of the configuration of the fire wall 300 is the same as the conventional fire wall 200 of FIG. 10 described earlier, the explanation of the remaining configuration is not repeated here.

Let us consider a case in which the mobile host 24 pertaining to the local-area network 21 in an organization moves out from the organization network 21 and then gets connected to the wide-area network 23 in order to transmit a packet to the host 25 in the local-area network 21 to which the mobile host 24 belongs. In this case, as a transmitting host, the mobile host 24 produces a source-host authenticator and includes the source-host authenticator in the header of the packet.

In addition, a predetermined secret key (Ks) common to the mobile host 24 and the fire wall 300 is shared by and stored in both the mobile host 24 and the fire wall 300. The secret key has a length of typically 128 bits.

The transmitted packet has a typical format like the one shown in FIG. 4. As shown in the figure, the packet includes a header and data. The header includes fields for a source address (a source IP address), a source identifier (a source VIP address), a source-address version, a time stamp, a source-host authenticator, a destination address (a destination IP address), a destination identifier (a destination VIP address) and a destination-address version.

Typically, a source-host authenticator can be calculated as follows. That is to say, a source-host authenticator is calculated by computing a kind of check-sum using an algorithm such as the MD5 (Message Digest 5) technique on data resulting from linking the secret key (Ks) to pieces of data stored in the fields for the source address, the source identifier, the source-address version and the time stamp. The MD5 technique generates a 16-byte (128-bit) check-sum from data having any arbitrary length.

In addition, besides the MD5 technique, the following algorithms can each be used as an encryption algorithm:

1. DES (Data Encryption Standard), for details refer to National Bureau of Standards FIPS Publication 46, 1977.
2. FEAL (Fast Encryption Algorithm), for details refer to S. Miyaguchi: The FEAL Cipher Family, Lecture Notes in Computer Science, 537(1001), pp 627 to 638, (Advances in Cryptology-CRYPTO '90).

On the other hand, the following algorithms can also be used as a message digest algorithm as well:

1. MD4 (Message Digest algorithm), for details refer to R. L. Rivest: The MD4 message digest algorithm, Lecture Notes in Computer Science, 537(1001), pp 303 to 311, (Advances in Cryptology-CRYPTO '90).
2. SHS (Secure Hash Standard), for details refer to Secure Hash Standard, National Bureau of Standards FIPS Publication 180, 1993.

It should be noted that details of the DES and FEAL algorithms are also described in 'Encipherment and Information Security' authored by Tsujii and Kasahara, July 1993.

Figure 5:
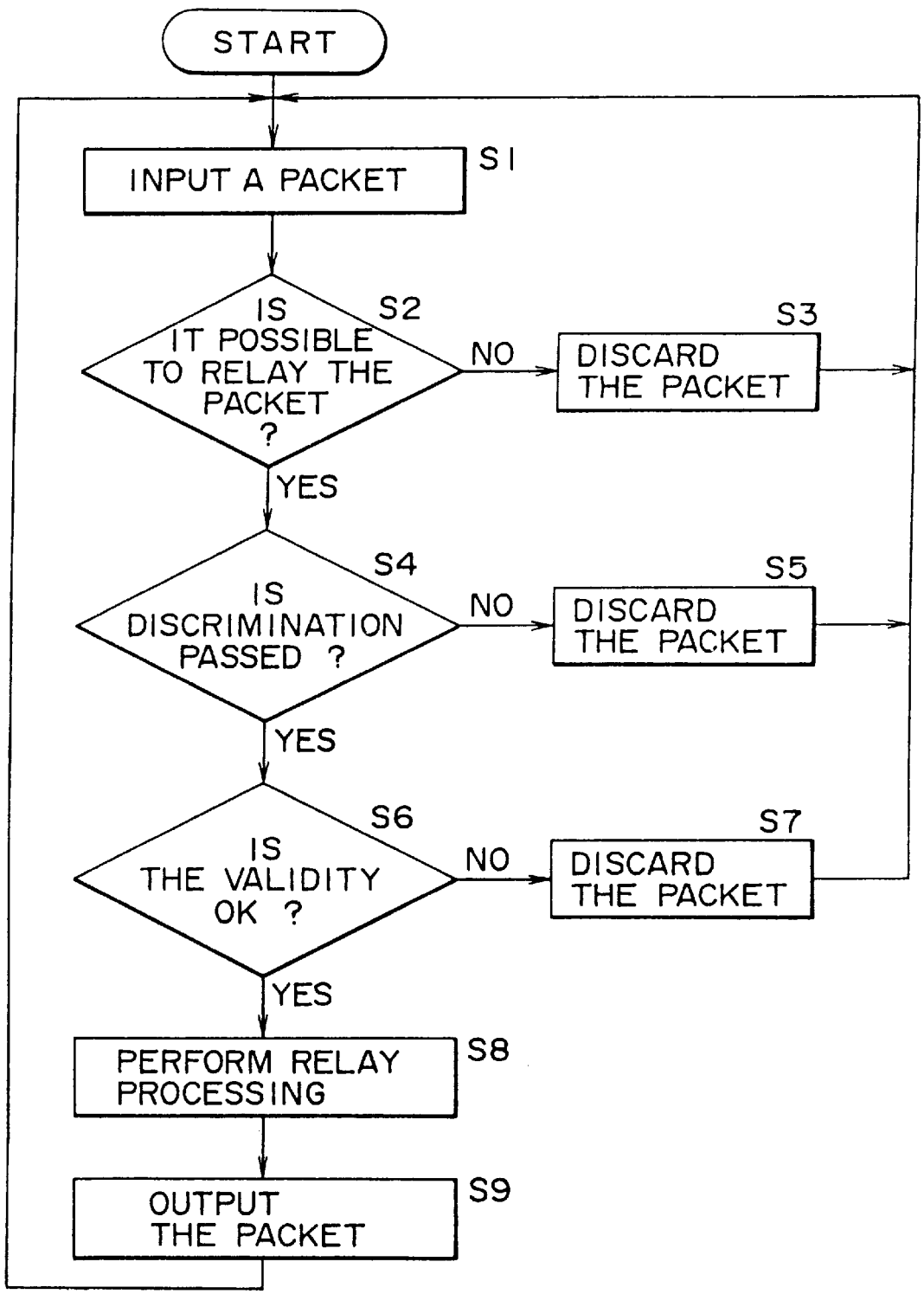
FIG. 5 is a diagram showing a flowchart used for explaining the operation of the fire wall shown in FIG. 3.

Next, operations which are carried out by the fire wall 300 when the mobile host 24 pertaining to the local-area network 21 in an organization moves out from the organization network 21 and then gets connected to the wide-area network 23 in order to transmit a predetermined packet to the host 25 in the local-area network 21 are explained by referring to a flowchart shown in FIG. 5.

First of all, the packet transmitted by the mobile host 24 arrives at the fire wall 300. At a step S1, the packet is input by the network interface 1a shown in FIG. 3 for example. That is to say, in this case, the fire wall 300 is connected to the wide-area network 23 through the network interface 1a.

The processing flow then goes on to a step S2 at which the packet received by the network interface 1a of the fire wall 300 is checked to find out whether or not the packet can be relayed by using the routing table 3. In the case of the network 21 which is connected to the fire wall 300, for example, the processing carried out at the step S2 confirms the existence or the non-existence of a host in the network 21, which host is indicated by a destination address included in the header of the packet received by way of the network interface 1a.

If the outcome of the processing carried out at the step S2 indicates that the host denoted by a destination address included in the header of the packet does not exist in the network 21, the processing flow proceeds to a step S3 at which the packet is just discarded. Then, the processing flow returns to the step S1, to repeat the pieces of processing of the steps S1 and S2.

If the outcome of the processing carried out at the step S2 indicates that the host denoted by a destination address included in the header of the packet exists in the network 21, on the other hand, the processing flow proceeds to a step S4.

At the step S4, the packet discriminating unit 11 determines whether or not the packet should be relayed. Typically, the packet discriminating unit 11 makes a judgment as to whether or not the packet has been transmitted by a mobile home which pertains to the network 21 in the organization. Only a packet that has been transmitted by a mobile home pertaining to the network 21 in the organization should be relayed. If the packet is found out to be a packet which should not be relayed, the processing flow goes on to a step S5 at which the packet is just discarded. Then, the processing flow returns to the step S1, to repeat the pieces of processing of the step S1 and the subsequent steps.

If the packet is found out to be a packet which should be relayed, on the other hand, the processing flow goes on to a step S6.

At the step S6, the authenticator 31 employed in the fire wall 300 determines whether or not information in the header of the packet received at the step S1 is valid information. In further detail, the authenticator 31 has the same secret key and the same processing method (typically the MD5 technique) for calculating a kind of check sum as the ones utilized by the host 24. The authenticator 31 recalculates the source-host authenticator of the transmitting host in its own right on the basis of its secret key and the contents of the header of the packet by using the processing method in the same way as the processing carried out by the mobile host 24 described earlier.

Then, the source-host authenticator, the checksum obtained from the calculation, is compared with the source-host authenticator included in the header of the packet input by way of the network interface 1a to find out whether or not both the source-host authenticators match each other. If both the source-host authenticators match each other, the information in the header of the received packet is verified to be valid information.

If both the source-host authenticators do not match each other, on the other hand, the information in the header of the received packet is determined to be invalid information. In this case, the processing flow goes on to a step S7 at which this packet is just discarded. Then, the processing flow returns to the step S1, to repeat the pieces of processing of the step S1 and the subsequent steps.

As described above, if both the source-host authenticators match each other, the information in the header of the received packet is verified to be valid information, that is, the packet is verified to be indeed a packet transmitted by the mobile host 24 pertaining to the local-area network 21. In this case, the processing flow proceeds to a step S8.

At the step S8, processing to relay the packet is carried out. That is to say, a route to a network, in which a host indicated by the destination address of the packet exists, is determined from the routing table 3. Then, the transmission-network-interface determining unit 2 selects a network interface on the determined route to the network to receive the packet, for example, the network interface 1b among the network interfaces 1a to 1c. That is to say, in this case, the fire wall 300 and the network 21 are connected to each other by the network interface 1b.

Then, the processing flow goes on to a step S9 at which the packet is output, being relayed to the network 21 by way of the network interface 1b.

Afterward, the processing flow returns to the step S1, to repeat the pieces of processing of the step S1 and the subsequent steps.

In this way, the fire wall 300 can selectively relay only a packet transmitted from the mobile home 24, which pertains to the network 21 of its own organization, to the network 21, allowing communication security to be enhanced.

Figure 6:
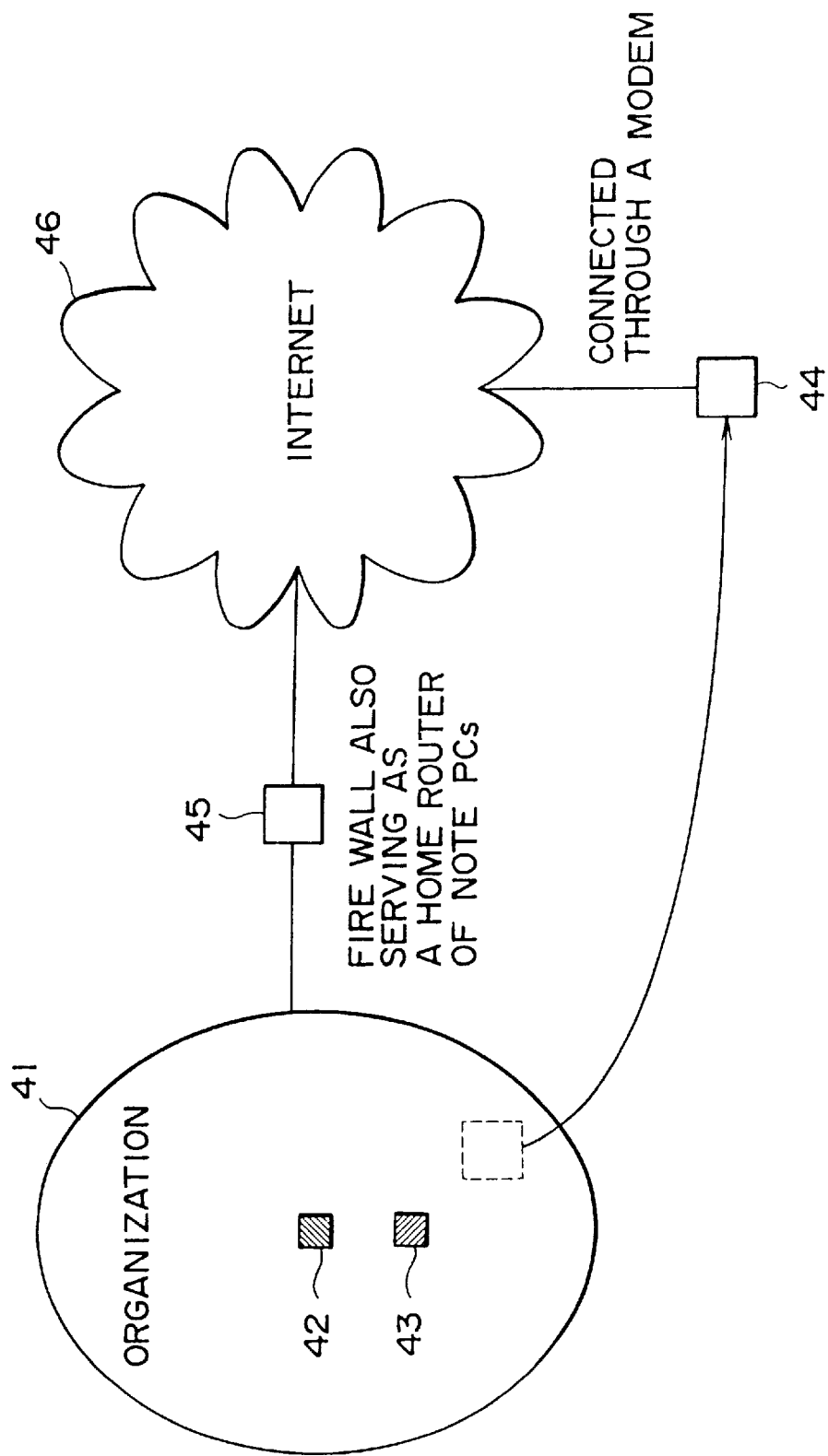
FIG. 6 is a diagram showing a typical configuration of another embodiment implementing networks to which the communication system provided by the present invention is applied.

FIG. 6 is a diagram showing a typical configuration of another embodiment implementing a network to which the communication system provided by the present invention is applied. As shown in the figure, a certain organization 41 has a mail server 42 and an FTP (File Transfer Protocol) server 43 and is connected to the Internet 46 through a fire wall 45. A note PC (personal computer) 44 pertaining to the organization 41 departs from the organization 41 and then gets connected to the Internet 46 through a modem in order to communicate with the mail server 42.

Figure 7:
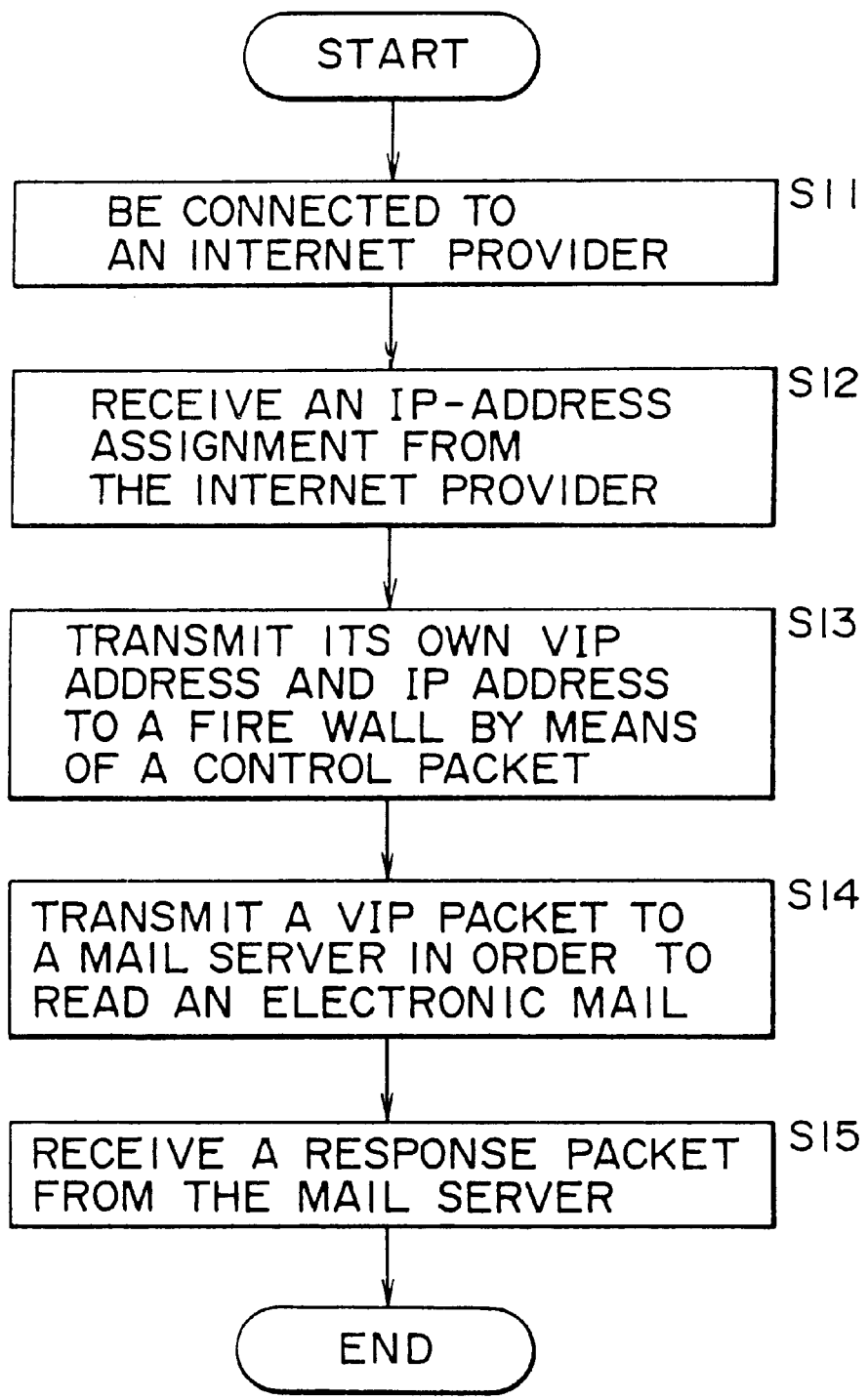
FIG. 7 is a diagram showing an operational procedure of a note PC 44 for making an access to a mail server 42 from a location outside an organization in the embodiment shown in FIG. 6.
Figure 8:
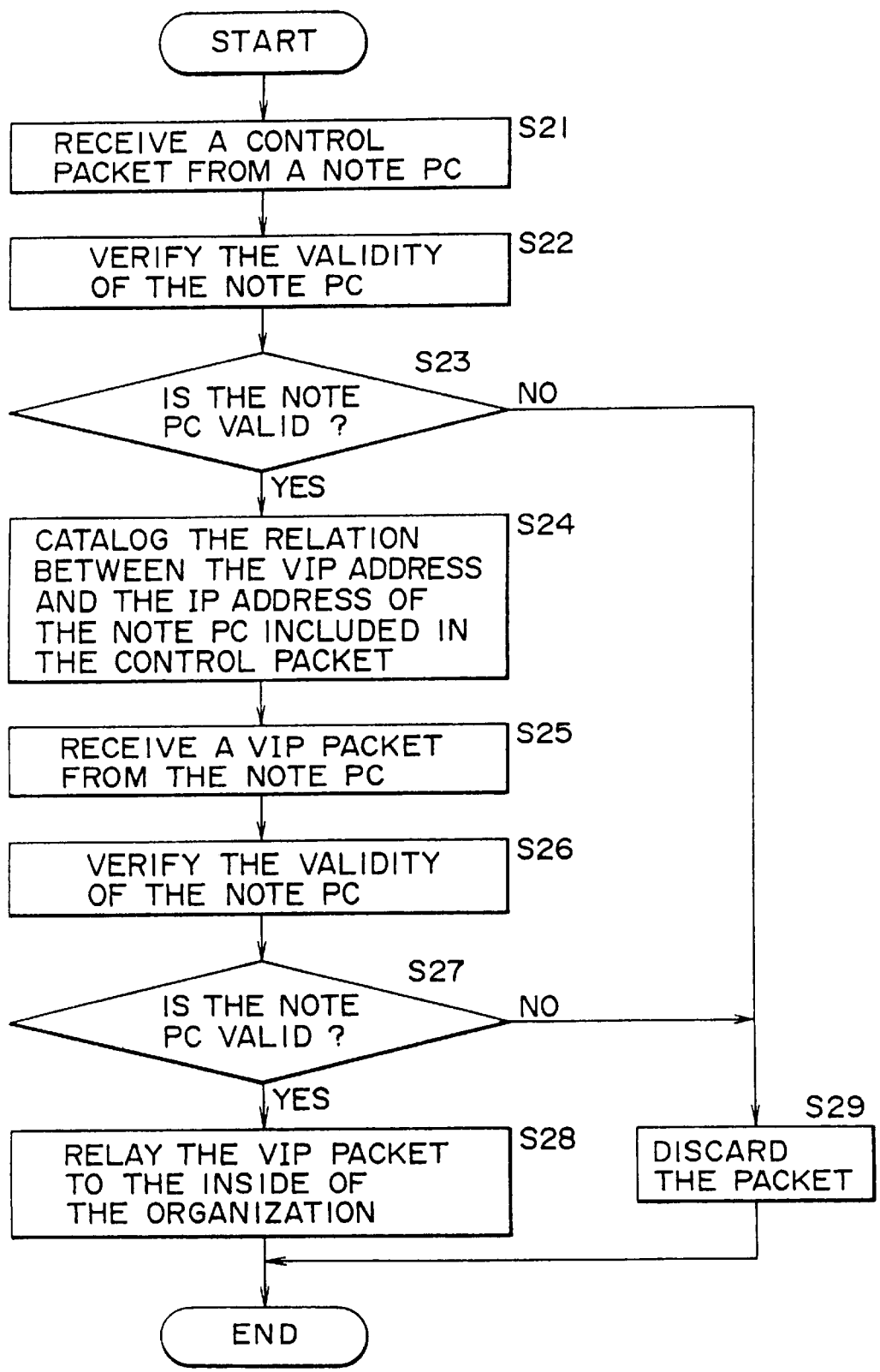
FIG. 8 is a diagram showing an operational procedure of a fire wall 45 to be followed when the note PC 44 makes an access to a mail server 42 from a location outside an organization in the embodiment shown in FIG. 6.
Figure 9:
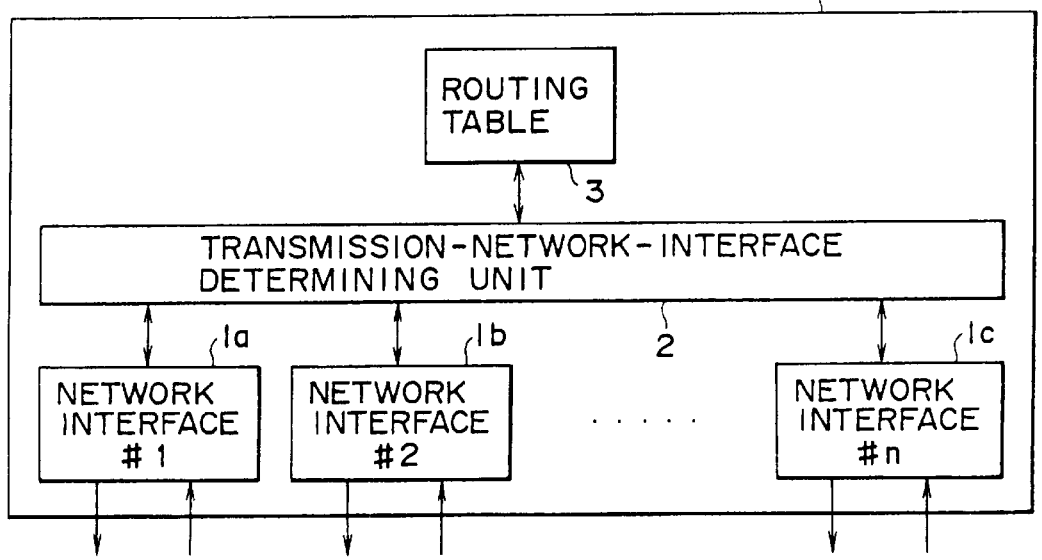
FIG. 9 is a block diagram showing a typical configuration of the conventional router.

Next, a case in which the note PC 44 pertaining to the organization 41 is connected to the Internet 46 as shown in FIG. 6 and makes an access to the mail server 42 is explained by referring to FIGS. 7 and 8. It should be noted that, basically, an access to the FTP server 43 can be made in the same way as an access to the mail server 42.

Here, the VIP is implemented in the note PC 44 and the fire wall 45 which also serves as a home router of the note PC 44. In addition, the fire wall 45 relays a packet from the inside of the organization to the outside of the organization unconditionally. The fire wall 45 and the note PC 44 share a common secret key and each have a predetermined calculation method (for example, the MD5 technique) stored therein.

FIG. 7 is a diagram showing a flowchart representing an operational procedure of the note PC 44 and FIG. 8 is a diagram showing a flowchart representing an operational procedure of the fire wall 45.

First of all, at a step S11 shown in FIG. 7, for example, the user dials up a number from a hotel during a business trip, for example, in order to connect the note PC 44 to an Internet provider through a modem and the telephone line. The operational procedure then goes on to a step S12 at which the note PC 44 receives an IP-address assignment from the Internet provider. This is because the IP address of the note PC 44 changes as a result of the movement of the note PC 44. However, the VIP address of the note PC 44 does not change. In this way, the note PC 44 pertaining to the organization 41 can be connected to the Internet 46 at a predetermined place outside the organization 41.

The operational procedure then goes on to a step S13 at which the note PC 44 transmits its own VIP address and the IP address to the fire wall (home router) 45 by using a control packet.

Since validity data corresponding to the sourcehost authenticator shown in FIG. 4 is included in the header of the control packet transmitted by the note PC 44 as part of header information, the fire wall 45 can check whether or not the note PC 44 is a valid host by carrying out the same processing as that used in the procedure for the embodiment shown by the diagrams of FIGS. 1 to 5.

On the other hand, at a step S21 shown in FIG. 8, the fire wall 45 receives the control packet transmitted by the note PC 44. The operational procedure then goes onto a step S22 at which the validity of the note PC 44 is verified on the basis of the source-host authenticator included in the header of the control packet and other header information. The operational procedure then goes on to a step S23 at which the fire wall 45 makes a judgment as to whether or not the note PC 44 is a valid host by using a result of validation carried out at the step S22. That is to say, the fire wall 45 makes a judgment as to whether or not the note PC 44 is indeed a computer which pertains to its own organization. If the note PC 44 is found invalid, the operational procedure goes on to a step S29 at which the packet is just discarded to end the processing. If the note PC 44 is found valid, on the other hand, the operational procedure goes on to a step S24 at which the relation between the VIP address and the IP address of the note PC 44, which are included in the header of the control packet transmitted by the note PC 44, is cataloged in the AMT.

As a result, thereafter, the fire wall 41 can convert the VIP address of the note PC 44 into an IP address by using the relation thereof cataloged in the AMT.

The operational procedure shown in FIG. 7 then goes on to a step S14 at which, in order for the user to read mail (strictly speaking, electronic mail) sent to the user by making an access to the mail server 42 in the organization 41, the note PC 44 transmits a predetermined VIP packet for requesting transmission of the electronic mail to the mail server 42 in the organization 41. The VIP packet includes validity data of the note PC 44 which corresponds to the source-host authenticator shown in FIG. 4.

The operational procedure shown in FIG. 8 then goes on to a step S25 at which the fire wall 45 intercepts the VIP packet transmitted by the note PC 44 to the mail server 42. The operational procedure then proceeds to a step S26 at which the validity of the note PC 44 is checked on the basis of the source-host authenticator included in the header of the VIP packet transmitted by the note PC 44 and other header information. The operational procedure then goes on to a step S27 at which the fire wall 45 determines whether or not the note PC 44 is a valid source by using the result of the validity checking carried out at the step S26. That is to say, the fire wall 45 determines whether or not the note PC 44 is a computer that really pertains to the organization 41. If the note PC 44 is determined to be an invalid source, the operational procedure goes on to the step S29 at which the packet is just discarded to end the processing. If the note PC 44 is found valid, on the other hand, the operational procedure goes on to a step S28 at which the VIP packet is relayed to the inside of the organization 41.

Thereafter, the relayed VIP packet arrives at the mail server 42 at which the request made by the user through the VIP packet is processed. In this case, if an electronic mail for the user exists, a response packet including the electronic mail is transmitted to the note PC 44. If such an electronic mail does not exist, on the other hand, a response packet indicating the non-existence of the electronic mail is transmitted to the note PC 44. At that time, the mobility-transparent communication function or the mobility transparency provided by the VIP as described earlier enables the response packet to arrive at the note PC 44 by way of the fire wall 45 and the Internet 46 without regard to the geographical position of the note PC 44.

To put it in detail, the response packet includes the VIP address of the note PC 44 which is converted by the fire wall 45 into an IP address by using the AMT. The IP address is in turn used for delivering the response packet to the note PC 44 by way of the Internet 46.

The operational procedure shown in FIG. 7 then goes on to a step S15 at which the response packet transmitted by the mail server 42 is received by the note PC 44. If an electronic mail for the user is included in the response packet, the contents of the electronic mail are displayed on a screen. If an electronic mail for the user is not included in the response packet, on the other hand, a predetermined message is displayed on the screen to inform the user that there is no electronic mail.

In this way, the user can read an electronic mail for the user at any arbitrary location such as a business-trip destination by making an access to the mail server 42 inside the organization 41 through the fire wall 45. By the same token, the user can send an electronic mail to the mail server 42 in the organization 41. In this case, a VIP packet including the electronic mail that the user wants to send is transmitted to the mail server 42.

In recent years, there is a number of users who read and write an electronic mail by making an access from any arbitrary location to the mail server in the organization by means of a note-book computer which is carried by the user from place to place. As described above, in the VIP, a fire wall verifies the validity of a mobile computer on the basis of information stored in the fire wall and information included in the header of a packet transmitted by the mobile computer, allowing a packet transmitted by the mobile computer pertaining to the organization to be relayed to the inside of the organization with a high degree of security. In this way, the user can read and write an electronic mail by making an access from any arbitrary location outside the organization to the mail server in the organization by way of the Internet and the fire wall without being aware of the existence of the fire wall.

An embodiment in which the user makes an access to the mail server 42 by means of the note PC 44 has been explained above. It should be noted that, by the same token, the user can also make an access to the FTP server 43 in the organization 41 by way of the fire wall 45 using the note PC 44 in accordance to a procedure which is basically similar to that for making an access to the mail server 42, allowing a file to be transferred between the FTP server 43 and the note PC 44. As a result, the user can request that a desired file be transferred to the user at any arbitrary location such as a business-trip destination by making an access to the FTP server 43 inside the organization 41 through the fire wall 45.

As described above, the embodiment adopts the MD5 technique to generate a source-host authenticator. It should be noted, however, that the method is not limited to the MD5 technique. Other methods can also be used as well.

In the embodiment described above, the present invention is applied to a network for exchanging packets in accordance with the virtual Internet protocol. It should be noted, however, that the present invention can also be applied to a network for exchanging packets in accordance with another protocol.

While the preferred embodiments of the present invention have been described using specific terms, such description is for illustrative purposes only, and it is to be understood that changes and variations may be made without departing from the spirit or scope of the followng claims.

What is claimed is:

1. A communication system, comprising:
   a communication apparatus for connecting a first network to a second network;
   a transmitting station provided in said first network; and
   a receiving station provided in said second network, wherein a packet transmitted to said receiving station by said transmitting station by way of said communication apparatus is selectively relayed by said communication apparatus to said second network, wherein a data portion of the packet is relayed as received by the communication apparatus,
   said transmitting station comprising:
      a first storage means for storing predetermined key information;
      a first processing means for storing a predetermined processing method and for creating first authentication information on the basis of said predetermined key information stored in said first storage means and header information of a packet to be transmitted to said receiving station in accordance with said predetermined processing method, said header information including a source identifier unique to said transmitting station, wherein said source identifier is a mobile-transparency identifier of said transmitting station, and a source address of said transmitting station, wherein said source address is a location indicator of said transmitting station,
      wherein said source identifier and said source address have a distinct relationship; and
      a transmitting means for transmitting said packet with said header information thereof including said first authentication information created by said first processing means, and said communication apparatus comprising:
- a second storage means for storing said predetermined key information;
- a second processing means for storing said predetermined processing method and for creating second authentication information on the basis of said predetermined key information stored in said second storage means and said header information of said packet transmitted by said transmitting station in accordance with said predetermined processing method, wherein said second authentication information includes the relationship between said source identifier and said source address included in said header information of said packet transmitted by said transmitting station determined by said second processing means;
- a comparison means for comparing said first authentication information included in said header information of said packet transmitted by said transmitting station with said second authentication information created by said second processing means; and
- a determination means for determining whether or not said packet is to be relayed to said second network in accordance with a result of comparison output by said comparison means.

2. A communication system according to claim 1, wherein said header information of said packet at least includes first information indicating a location of said transmitting station and second information which is used for identifying said transmitting station, said second information independent of the location of said transmitting station.

3. A communication system according to claim 2, wherein said communication apparatus further comprises: conversion means for converting said second information into said first information of said transmitting station.

4. A communication system according to claim 1, wherein a server or a plurality of servers are connected to said second network and a packet transmitted by said transmitting station to said server connected to said second network is relayed to said server only if said determination means of said communication apparatus determines that said packet is to be relayed to said second network.

5. A communication system according to claim 4, wherein said servers are each a mail server.

6. The communication system of claim 1, wherein said source identifier is a virtual Internet protocol (VIP) and said source address is an Internet Protocol (IP).

7. A communication apparatus comprising a plurality of network interfaces for relaying packets exchanged among networks, wherein a packet received from a transmitting station of one of said networks by way of one of said network interfaces is retransmitted to a receiving station of another one of said networks by way of another one of said network interfaces, said communication apparatus further comprising:
- an authentication means for checking whether or not header information included in said packet received from said transmitting station by way of said network interface is valid header information, said header information including a source identifier unique to said transmitting station, wherein said source identifier is a mobile-transparency identifier of said transmitting station, and a source address of said transmitting station, wherein said source address is a location indicator of said transmitting station,
- wherein said source identifier and said source address have a distinct relationship; and
- a control means which is used for controlling an operation to relay said packet to said receiving station only if said authentication means has verified that said header information included in said packet received from said transmitting station by way of said network interface is valid header information, wherein a data portion of the packet is relayed as received by the communication apparatus.

8. A communication apparatus according to claim 7, wherein said authentication means is used for storing predetermined key information in addition to a predetermined processing method and creates predetermined authentication information on the basis of said header information included in said packet received from said transmitting station by way of said network interface and said predetermined key information in accordance with said predetermined processing method in order to verify that said header information is valid header information by finding out whether said created authentication information matches authentication information included in said header information of said packet.

9. A communication apparatus according to claim 7, wherein said transmitting station is used for storing predetermined key information in addition to a predetermined processing method and creates authentication information on the basis of said header information of said packet and said predetermined key information, including said created authentication information in said packet as part of said header information.

* * * * *